United States Patent
Yagyu et al.

(10) Patent No.: US 6,957,277 B2
(45) Date of Patent: Oct. 18, 2005

(54) MULTICAST PACKET TRANSFERRING APPARATUS, MULTICAST PACKET TRANSFERRING SYSTEM AND STORAGE MEDIUM USED IN SAME

(75) Inventors: Tomohiko Yagyu, Tokyo (JP); Masahiro Jibiki, Tokyo (JP); Atsushi Iwata, Tokyo (JP)

(73) Assignee: NEC Corporation, Tokyo (JP)

( * ) Notice: Subject to any disclaimer, the term of this patent is extended or adjusted under 35 U.S.C. 154(b) by 875 days.

(21) Appl. No.: 09/793,698

(22) Filed: Feb. 27, 2001

(65) Prior Publication Data

US 2001/0018714 A1 Aug. 30, 2001

(30) Foreign Application Priority Data

Feb. 28, 2000 (JP) .................................. 2000-052446

(51) Int. Cl.[7] .............................................. G06F 15/16
(52) U.S. Cl. ...................... 709/245; 709/203; 709/236; 709/238; 370/389; 370/390; 370/392; 370/397; 370/400; 370/401; 370/432; 370/466; 370/467
(58) Field of Search ................................. 709/203, 236, 709/238, 245; 370/389, 392, 400, 401, 432, 466, 467, 390, 397

(56) References Cited

U.S. PATENT DOCUMENTS 5,555,244 A * 9/1996 Gupta et al. ................. 370/397

6,181,697 B1 * 1/2001 Nurenberg et al. .......... 370/390
6,269,404 B1 * 7/2001 Hart et al. ................... 709/238

FOREIGN PATENT DOCUMENTS

| JP | 61-214859 | 9/1986 |
|---|---|---|
| JP | 6-224912 | 8/1994 |
| JP | 8-186565 | 7/1996 |
| JP | 2001-177523 | 6/2001 |
| JP | 2001-230774 | 8/2001 |
| JP | 2001-244976 | 9/2001 |

OTHER PUBLICATIONS

D. Farinacci et al., Multicast Source Discovery Protocol (MSDP) <draft–ietf–msdp–spec–00.txt>, Dec. 1999, pp. 1–22.

* cited by examiner

Primary Examiner—Saleh Najjar
Assistant Examiner—Yves Dalencourt
(74) Attorney, Agent, or Firm—Young & Thompson

(57) ABSTRACT

Multicast packet transferring apparatus and system with a multicast packet transferred from one transferring apparatus existing in one domain to another transferring apparatus existing in another domain, the former transferring apparatus converts the multicast packet fed from a transmitter to a unicast packet and transfers the converted packet to the latter transferring apparatus. The latter transferring apparatus reconstructs the original multicast packet from the received unicast packet and rewrites to replace a transmitter address contained in the reconstructed multicast packet with an address of the transferring apparatus and then transfers the rewritten multicast packet having the rewritten address to specified receivers.

12 Claims, 6 Drawing Sheets

MULTICAST PACKET TRANSFERRING APPARATUS, MULTICAST PACKET TRANSFERRING SYSTEM AND STORAGE MEDIUM USED IN SAME

BACKGROUND OF THE INVENTION

1. Field of the Invention

The present invention relates to a multicast packet transferring apparatus used to transfer multicast packets between domains, a multicast packet transferring system made up of a plurality of the multicast packet transferring apparatuses and a computer readable storage medium used in each of the multicast packet transferring apparatus in the multicast packet transferring system.

The present application claims priority of Japanese Patent Application No. 2000-052446 filed on Feb. 28, 2000, which is hereby incorporated by reference.

2. Description of the Related Art

FIG. 8 is a block diagram showing configurations of a conventional multicast packet transferring system. As shown in FIG. 8, information provided by a rendezvous point (hereinafter referred simply to as "transmitter information") is exchanged between different multicast routing control domains ("routing control domain" being hereinafter referred simply to as a "domain"), a domain 10 and a domain 20 controlled in accordance with a core-based multicast routing protocol (hereinafter referred to as a "multicast routing protocol") including, for example, a PIM-SM (Protocol Independent Multicast-Sparse Mode).

Each of the domain 10 and domain 20 is provided with a multicast packet transferring apparatus (hereinafter referred simply to as a "transferring apparatus") serving as a rendezvous point. Each of the transferring apparatuses receives the transmitter information from a transmitter and, if there are receivers within the domain 10 or domain 20 having received the transmitter information, by being joined to the transmitter, establishes a multicast path between the transferring apparatus having received the transmitter information and the transmitter, across a boundary of the two domains, domain 10 and domain 20. Moreover, the multicast packet transferring system is disclosed, for example, in "Internet Draft by IETF (Internet Engineering Task Force) ("draft-ietf-msdp-spec-00" by Dino Farinacci et al., December 1999).

However, the conventional technology has following problems:

A first problem is that a transfer of the multicast packet through the domain not supporting the multicast routing protocol is impossible. A reason is that, since the multicast routing protocol joins in a hop-by-hop manner between the receiver and the transmitter, it is necessary that all routers connected between the receiver and the transmitter are capable to process joining of the multicast routing protocol.

A second problem is that, since the multicast packet cannot be transferred between domains through a path being different from a unicast path, a multicast path between domains cannot be established explicitly. A reason is that, since the multicast path is established by the joining of the multicast routing protocol, the multicast path is always established in a direction opposite to the unicast path formed from a receiver side to a transmitter side and that a multicast router positioned nearest to a receiver having received packets whose numbers have exceeded specified level switches to a path not passing through a rendezvous point and changes the multicast path by being joined directly to the transmitter as shown in FIG. 8. Because of this, if the unicast path formed from a rendezvous point side to the transmitter side is different from that formed from the receiver side to the transmitter side, as shown in FIG. 8, a duplicated flow of data between domains may occur. Such a policy to provide the unicast path whose going path and returning path are different from each other between the domains cannot be applied.

A third problem is that a policy to transfer multicast packets between domains cannot be managed at all. A reason is that the multicast routing protocol does not provide such a policy management mechanism.

SUMMARY OF THE INVENTION

In view of the above, it is an object of the present invention to provide a multicast packet transferring apparatus and system in which a multicast transferring path to which a policy mechanism of an existing unicast path is able to be applied between different domains is established and, by using the established multicast transferring path, multicast packets are able to be transferred.

It is another object of the present invention to provide the multicast packet transferring apparatus and system in which, even if there exists a domain (through which the multicast packet is to be passed) which does not support a multicast routing protocol, the multicast packets are able to be transferred between domains.

It is still another object of the present invention to provide the multicast packet transferring apparatus and system in which each of the multicast packet transferring apparatuses manages a policy of transferring multicast packets and in which policies of refusing to transmit packets to receivers belonging to an unauthorized group or of refusing to receive packets from unauthorized transmitters between domains and of dealing with accounting for each packet or maintaining communication quality can be established by a user.

According to a first aspect of the present invention, there is provided a multicast packet transferring apparatus including:

a packet converting means to convert a multicast packet fed from a transmitter to a unicast packet; and a packet transferring means to transfer the converted unicast packet to a multicast packet transferring apparatus existing in an other domain.

According to a second aspect of the present invention, there is provided a multicast packet transferring apparatus having an apparatus address including:

a packet reconstructing means to reconstruct an original multicast packet from a unicast packet fed from a multicast packet transferring apparatus existing in an other domain;

a rewriting means to rewrite for replacing a transmitter address contained in the reconstructed multicast packet with the apparatus address; and a packet transferring means to transfer the multicast packet having the rewritten transmitter address to a specified receiver In the foregoing second aspect, a preferable mode is one wherein information about at least the transmitter address and a multicast group corresponding to each of port numbers is controlled and a destination port number contained in the multicast packet is rewritten to corresponding one of the port numbers.

According to a third aspect of the present invention, there is provided a multicast packet transferring system including:

a first transferring apparatus existing in a first domain;

a second transferring apparatus existing in a second domain; and wherein the first transferring apparatus converts a multicast packet fed from a transmitter to a unicast packet and transfers the converted unicast packet to the second transferring apparatus and wherein the second transferring apparatus reconstructs an original multicast packet from the unicast packet fed from the first transferring apparatus, rewrites to replace an transmitter address contained in the reconstructed multicast packet with an address of the second transferring apparatus and transmits the rewritten multicast packet having the rewritten address to a specified receiver.

In the foregoing third aspect, a preferable mode is one wherein the second transferring apparatus controls information about at least the transmitter address and a multicast group corresponding to each of port numbers and rewrites a destination port number of the reconstructed multicast packet to corresponding one of the port numbers.

Also, a preferable mode is one wherein, when the specified receiver carries out communications with the transmitter in a unicast transmission manner, the specified receiver transmits the unicast packet to the second transferring apparatus having the rewritten transmitter address and the second transferring apparatus judges to which transmitter the unicast packet addressed to the second transferring apparatus is to be addressed, based on a port number which uniquely corresponds to each of receivers and transmitters belonging to a multicast group.

Also, a preferable mode is one wherein, by converting the multicast packet to the unicast packet and by transferring the converted unicast packet between the first domain and the second domain, a multicast path in which multicast transferring through a domain not supporting multicast transmission is established.

Furthermore, a preferable mode is one wherein, by setting multicast transferring policies about peering representing transferring relations to the first and the second transferring apparatus, policies about permission transferring apparatus of packet transferring to receivers or transmitters belonging to a multicast group, communication qualities and accounting for packets are set.

According to a fourth aspect of the present invention, there is provided a multicast packet transferring apparatus including:

a computer;

a program for causing the computer to carry out a procedure for receiving a multicast packet from a transmitter, a procedure for converting the multicast packet to a unicast packet and a procedure for transferring the converted unicast packet to a multicast packet transferring apparatus existing in an other domain.

Also, according to a fifth aspect of the present invention, there is provided a multicast packet transferring apparatus including:

a computer;

a program for causing the computer to carry out a procedure for receiving a unicast packet from a multicast packet transferring apparatus existing in an other domain, a procedure for reconstructing an original multicast packet from the received unicast packet, a procedure for rewriting to replace a transmitter address contained in the reconstructed multicast packet with an address of a transferring apparatus having received the unicast packet and a procedure for transferring the rewritten multicast packet having the rewritten transmitter address to specified receiver.

Also, according to a six aspect of the present invention, there is provided a computer readable storage medium storing a program for causing a computer to carry out a procedure for receiving a multicast packet from a transmitter, a procedure for converting the multicast packet to a unicast packet and a procedure for transferring the converted unicast packet to a multicast packet transferring apparatus existing in an other domain.

Furthermore, according to a seventh aspect of the present invention, there is provided a computer readable storage medium storing a program for causing a computer to carry out a procedure for receiving a unicast packet from a multicast packet transferring apparatus existing in an other domain, a procedure for reconstructing an original multicast packet from the received unicast packet, a procedure for rewriting to replace a transmitter address contained in the reconstructed multicast packet with an address of a transferring apparatus having received the unicast packet and a procedure for transferring the rewritten multicast packet having the rewritten transmitter address to specified receiver.

With the above configurations, by transferring the multicast packet in a form of the unicast packet between domains, a most optimum multicast path can be explicitly established between domains using an existing unicast policy control technology. This is achieved by transferring the multicast packet which has been converted to the unicast packet between transferring apparatuses and by setting an address of the transferring apparatus having received the packet as a transmitter address of the multicast packet when the transferred multicast packet is distributed to receivers within the domain. By doing this, since a receiver or a router considers that the transmitter of the packet exists within a same domain, a multicast routing protocol does not allow a multicast path to be established across a boundary of the domain.

With another configuration as above, the multicast packet can be transferred even through a domain not supporting multicast packet transmission.

With still another configuration as above, since all transfer of the multicast packet between domains is performed via the transferring apparatus, by setting multicast transferring policies to the transferring apparatus, a multicast transferring policy control between domains can be realized.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Embodiment

Figure 1:
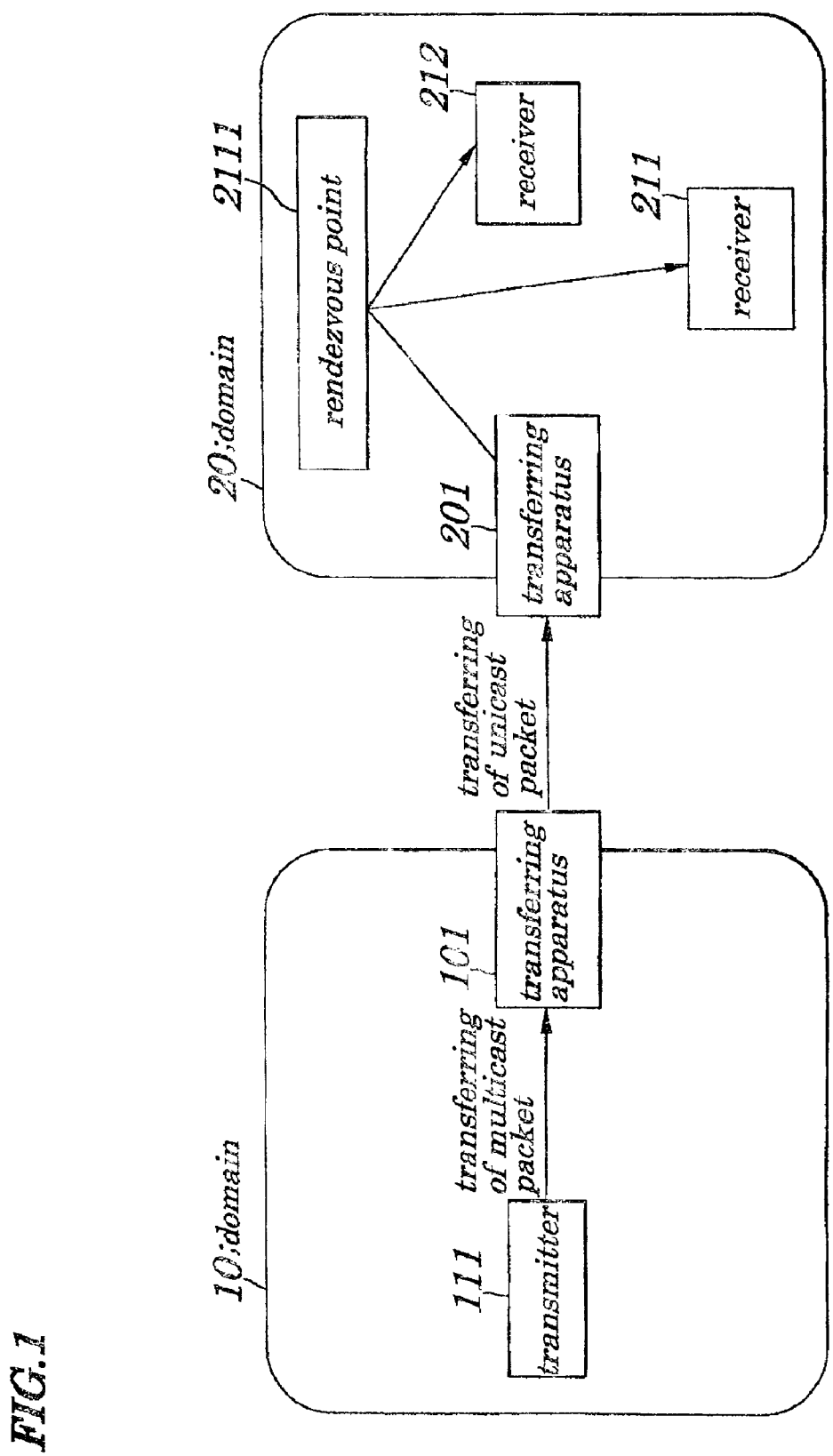
FIG. 1 is a block diagram showing configurations of a multicast packet transferring system using multicast packet transferring apparatuses according to an embodiment of the present invention.

FIG. 1 is a block diagram showing configurations of a multicast packet transferring system using a multicast packet transferring apparatus according to an embodiment of the present invention. In FIG. 1, a domain 10 and a domain 20 are those controlled according to a multicast routing protocol. In the domain 10 exists a transferring apparatus 101 and in the domain 20 exists a transferring apparatus 201. The transferring apparatus 101 and transferring apparatus 201 are set so that a transferring relationship (hereinafter referred to as "peering") is established after operations of the transferring apparatus 101 and transferring apparatus 201 have been started.

In the domain 10 exists a transmitter 111 belonging to a group of transmitters to whom a multicast-type transmission is applied (the "group" hereinafter being referred to as a "multicast group") and in the domain 20 exists receiver 211 and receiver 212 belonging to a group of receivers to whom the multicast-type transmission is applied (the "group" hereinafter being referred to also as the "multicast group". A rendezvous point 2111 is a rendezvous point belonging to the multicast group in the domain 20. Each of the transferring apparatus, transmitters and receivers has its own address. In the embodiment, let it be assumed that an address of the transferring apparatus 102 is R1, an address of the transferring apparatus 201 is R2, an address of the transmitter 111 is S1, an address of the receiver 211 is V1 and an address of the receiver 212 is V2.

Figure 2:
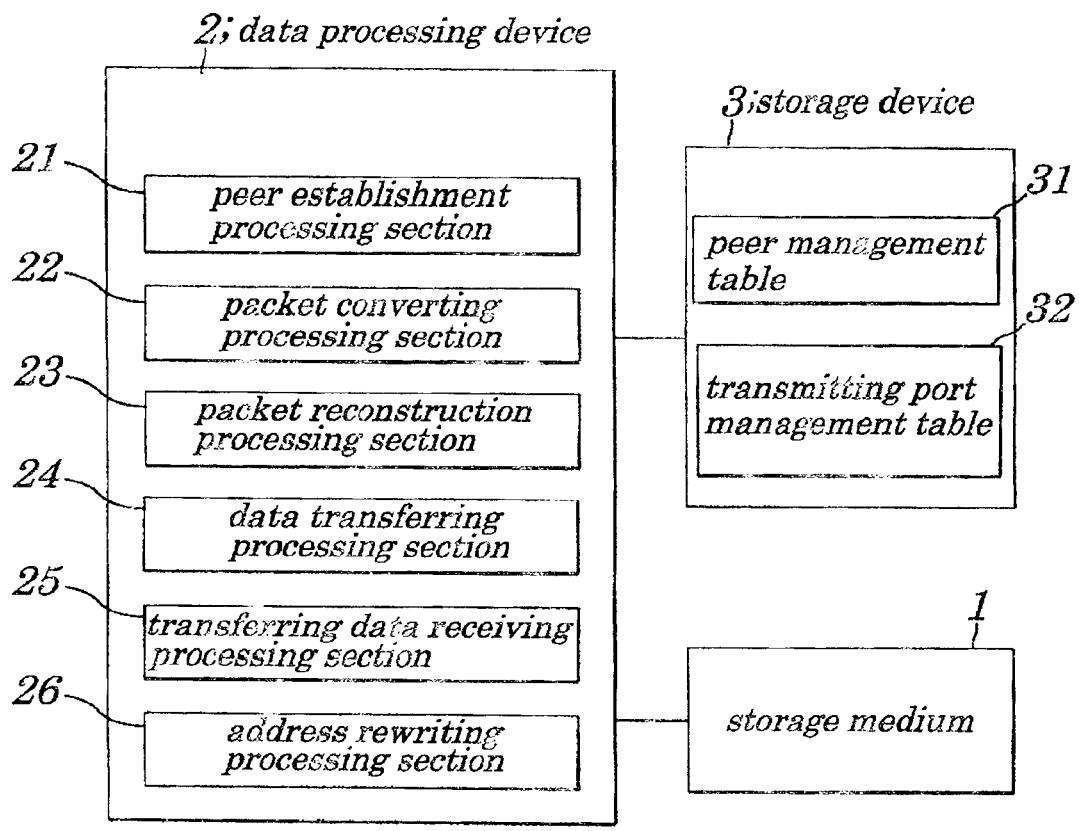
FIG. 2 is a block diagram showing internal configurations of the multicast packet transferring apparatus according to the embodiment of the present invention.

FIG. 2 is a block diagram showing internal configurations of each of the transferring apparatus 101 and transferring apparatus 201 according to the embodiment of the present invention. The transferring apparatus 101, 201 is provided with a storage medium 1 storing a packet transferring program and an address rewriting program. These programs stored in the storage medium 1 is read into a data processing device 2 so as to control operations of the data processing device 2.

The storage medium 1 makes up a computer-readable storage medium of the present invention, for which a variety of types of disk media, magnetic recording media, semiconductor memories, or likes are used.

A storage device 3 stores a peer management table 31 and a transmitting port management table 32 and updates each of the tables, peer management table 31 and transmitting port management table 32, in response to a request from the data processing device 2. The data processing device 2 includes a peer establishment processing section 21, a packet converting processing section 22, a packet reconstruction processing section 23, a data transferring processing section 24, a transferring data receiving processing section 25 and an address rewriting processing section 26.

Next, operations of the multicast packet transferring system using the transferring apparatus will be described below.

As shown in FIG. 1, in the embodiment, let it be assumed that the peering, that is, the transferring relationship has been established between the transferring apparatus 101 and transferring apparatus 201 and operations are confirmed by periodically transmitting a confirmation packet. Each of the transferring apparatuses 101, 201 controls the peering using the peer management table 31. The peer management table 31 stores information about policies, which includes data on which port should be used for transferring packets in every peering, information about receivers or transmitters belonging to the multicast group allowed to receive or transfer packets and about accounting, communication qualities or a like. The transferring apparatus 101, 201 serve as the receivers belonging to the multicast groups in accordance with the peer management table 31 when the transferring is commenced.

Figure 3:
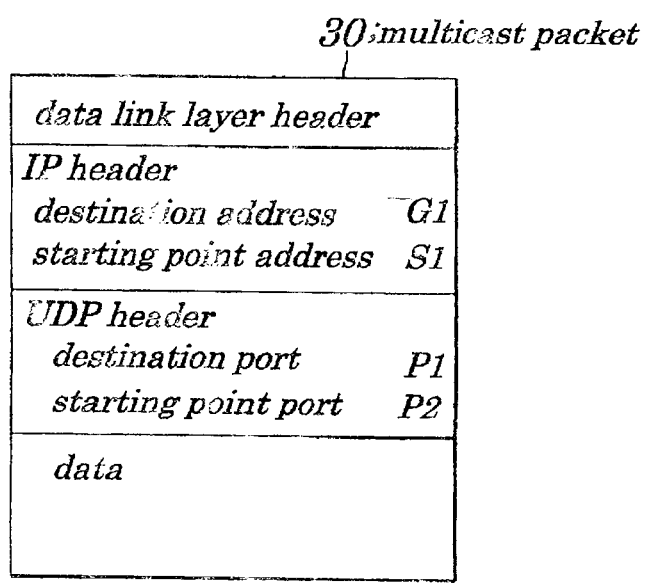
FIG. 3 shows configurations of a multicast packet to be transferred from a transmitter employed in the multicast packet transferring apparatus according to the embodiment of the present invention.

Then, the transmitter 111 transmits packets to a receiver belonging to the multicast group. A multicast packet 30, as shown in FIG. 3, is made up of a destination address G1 and a starting point address S1, a destination port P1, a starting point port P2 and data.

The multicast packet 30 transmitted from the transmitter 111 reaches the transferring apparatus 101 through a multicast path established in the domain 10. The transferring apparatus 101 having received the multicast packet from the transmitter 111, after converting the multicast packet to a unicast packet by the packet converting processing section 22 in accordance with a policy stored in the peer management table 31, transfers the converted packet to the transferring apparatus 201 with which the peering has been established.

Figure 4:
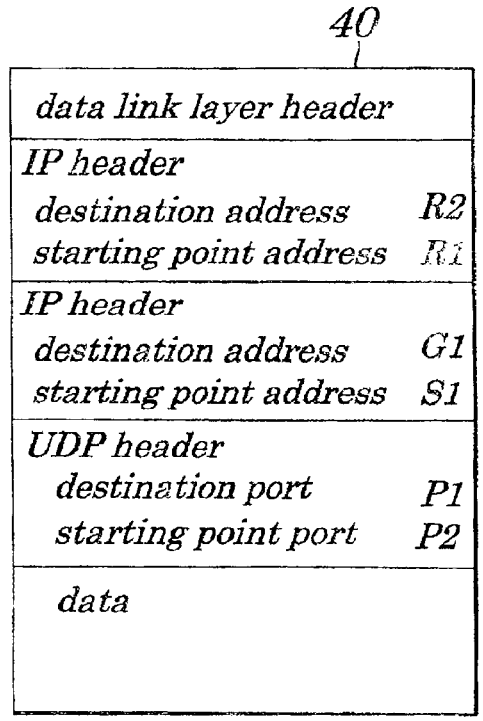
FIG. 4 shows configurations of a unicast packet to be transferred from one multicast packet transferring apparatus to another multicast packet transferring apparatus in FIG. 1 according to the embodiment of the present invention.

As shown in FIG. 4, in a unicast packet 40, an IP (Internet Protocol) header including a destination address R2 and a starting point address R1 are added to those in the multicast packet 30.

The transferring apparatus 201, when receiving the converted unicast packet 40 from the transferring apparatus 101, removes the IP headers from the unicast packet 40 and reconstructs the original multicast packet 30. The transferring apparatus 201 rewrites the address so that the starting point address S1 of the reconstructed multicast packet 30 is changed to be the address R2 of the transferring apparatus 201. Moreover, the transferring apparatus 201 retrieves a port number registered in the transmitting port management table 32 using the destination address, destination port, starting point address and starting point port of the multicast packet. In the transmitting port management table 32, the port numbers uniquely corresponding to each of receivers and transmitters belonging to the multicast group and each of destination ports and a pair of the transmitter and transmitting port are registered.

If there is a matched entry in the transmitting port management table 32, the starting point port P2 contained in the reconstructed packet is rewritten to replace the port P2 with a transmitting port number contained in the entry. When the transferring apparatus 201 receives, for the first time, a multicast packet transferred from a transmitter S1 and addressed to a receiver belonging to the multicast group, since no matched entry exists in the transmitting port management table 32, newly obtains an unused port number and rewrites to replace the starting point port of the multicast packet with the obtained port number and, at the same time, registers the newly obtained port number on the transmitting port management table 32.

Figure 5:
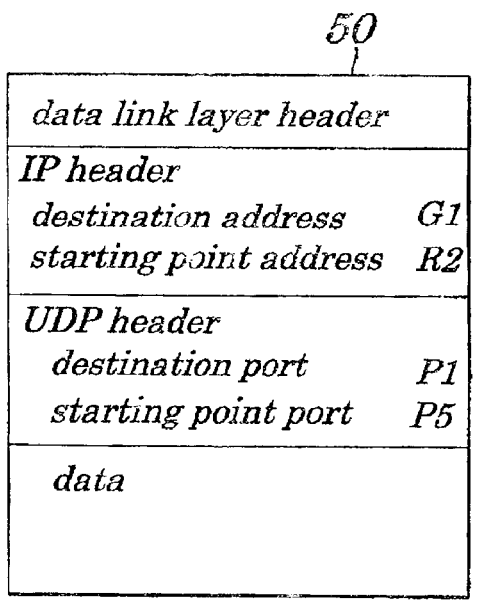
FIG. 5 shows configurations of another multicast packet to be transferred from the other multicast packet transferring apparatus to receivers within a domain in FIG. 1 according to the embodiment of the present invention.

The multicast packet having the rewritten starting point address and starting point port are transmitted to receivers 211, 212 within the domain 20. A multicast packet 50, as shown in FIG. 5, is made up of a destination address G1 and a starting point address R2, the destination port P1, a starting point port P5 and data.

The multicast packet 50 transmitted from the transferring apparatus 201 is received by a receiver 211.

A multicast router existing nearest to the receiver 211 within the domain 20, when the counted number of packets exceeds a threshold value, by being joined to the transmitter, switches the multicast path.

In the conventional technology, since the transmitter 111 exists in the domain 10 different from the domain where the receiver exists, joining has to be performed across the domains. As a result, if there happens to be a router being not operated in accordance with a same multicast routing protocol between the domains 10 and 20, the joining may fail. Even if the joining succeeds, since the path is established in a direction opposite to the unicast path formed from the receiver side to the transmitter side, a manager of the domain 20 cannot control the path between the domains. Therefore, there is a likelihood that an unintended path is established.

Figure 6:
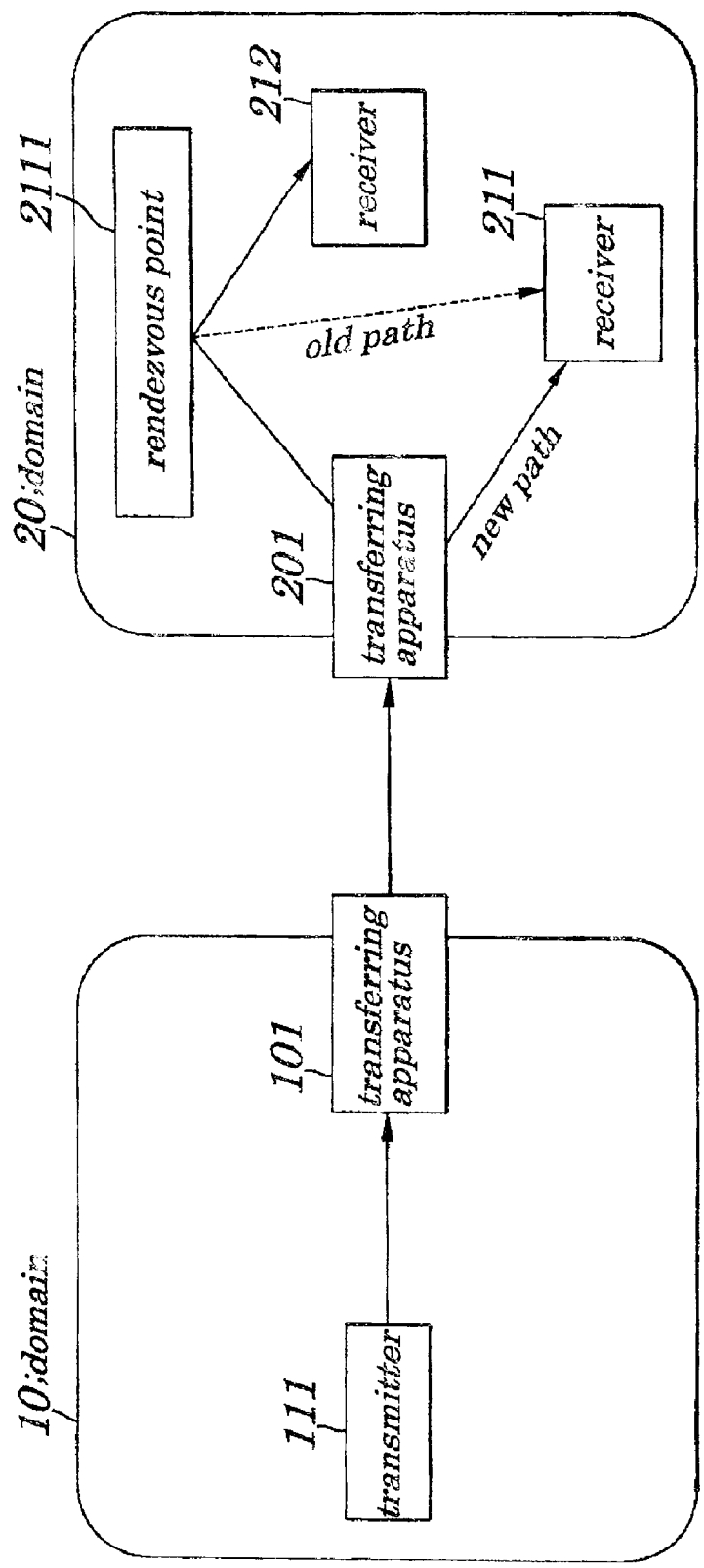
FIG. 6 is a block diagram showing operations of switching of multicast paths according to the embodiment of the present invention.

Thus, according to the embodiment, since all the routers within the domain 20 where the receiver 211 exists is adapted to judge the transferring apparatus 201 to be a transmitter of the multicast packet based on the starting point address R2, even if switching of the path occurs, as shown in FIG. 6, the change of the path is limited to connections within the domain 20, thus not affecting the transferring path between the domains 10, 20.

Figure 7:
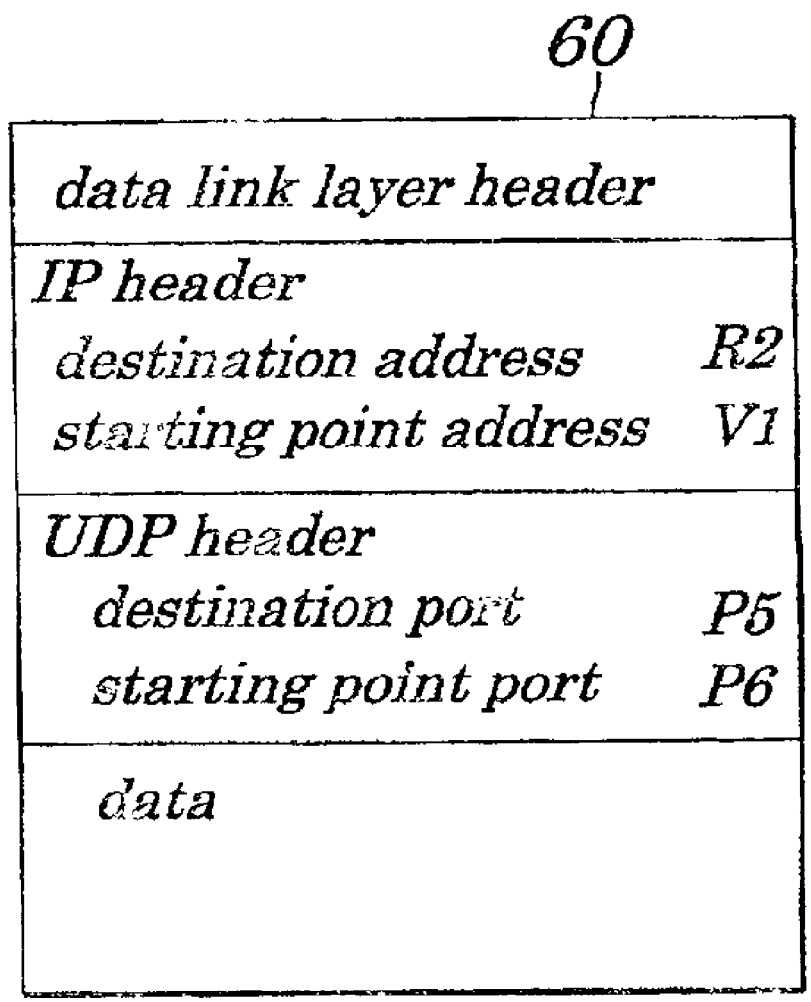
FIG. 7 shows configurations of a packet to be transferred from a receiver in FIG. 6 to a transmitter according to the embodiment of the present invention.
Figure 8:
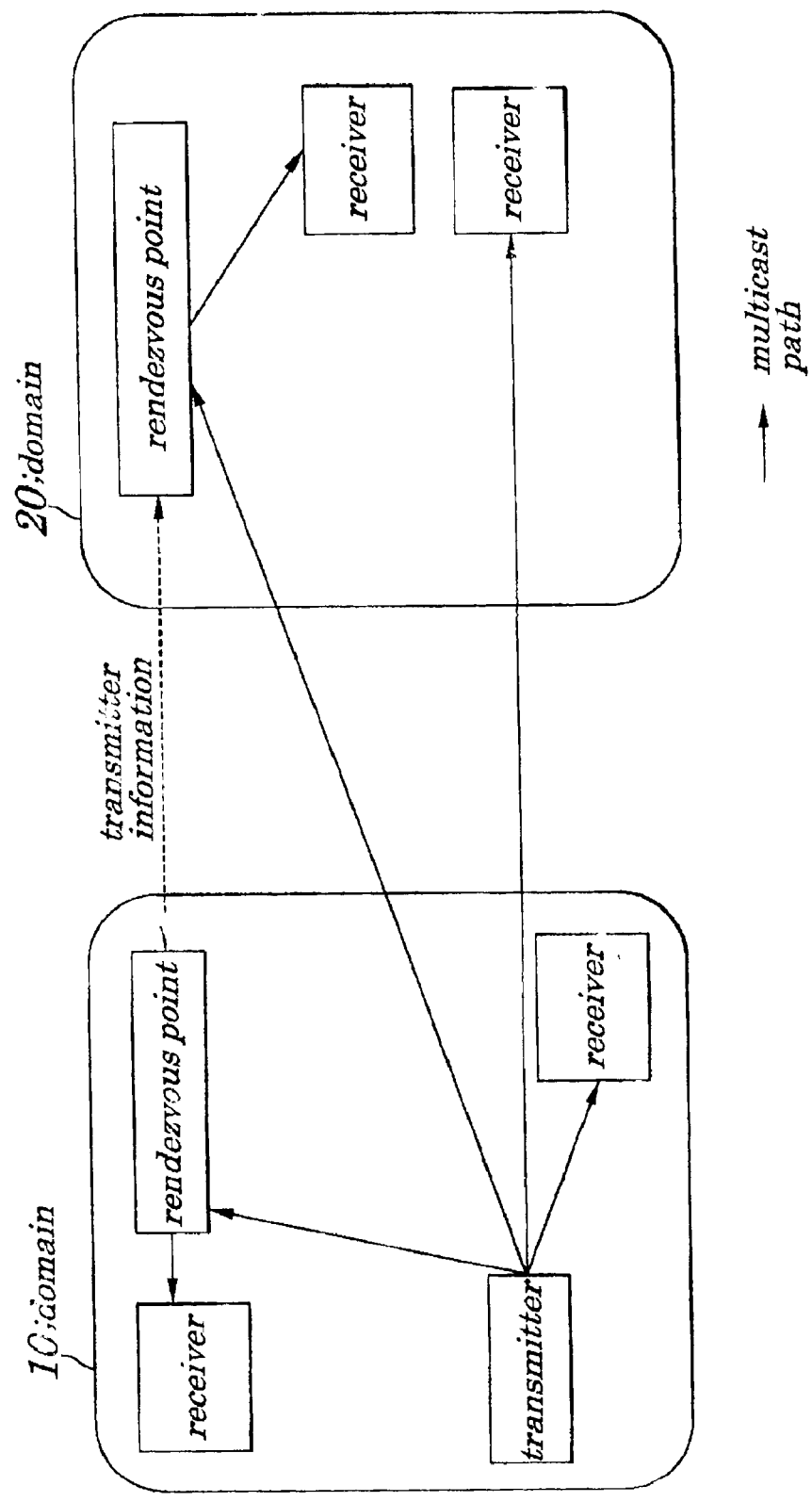
FIG. 8 is a block diagram showing configurations of a conventional multicast packet transferring system.

When the receiver 211 carries out communication in a unicast manner with the transmitter of the multicast packet 50 that the receiver has received, the receiver 211 transmits a packet 60 as shown in FIG. 7. The packet 60, as shown in FIG. 7, is made up of the destination address R2, a starting point address V1, the destination port P5, a starting point port P6 and data.

The transmitted packet 60 is received by the transferring apparatus 201. The transferring apparatus 201 retrieves a transmitting port and address registered in the transmitting port management table 32 based on a port number of the destination port to obtain the transmitter address S1 and the transmitting port of the original transmitter 111. Then, the transferring apparatus 201 rewrites to replace the destination address R2 and a destination port P5 contained in the received packet 60 with the original transmitter address S1 and the original transmitter port and transfers the packet 60 to the original transmitter 111. The transfer ensures communications from the receiver 211 to the transmitter 111.

It is apparent that the present invention is not limited to the above embodiments but may be changed and modified without departing from the scope and spirit of the invention.

What is claimed is:

1. A multicast packet transferring apparatus comprising:
a first multicast packet transferring apparatus operating in a first domain comprising
a packet converting means to convert a multicast packet fed from a transmitter, the packet fed from the transmitter having i) a first IP header with a group destination address and a starting point address identifying the transmitter and ii) a UDP header listing a destination port and a starting point port, to a unicast packet having the first IP header and a second IP header with a destination address identifying a receiving multicast packet transferring apparatus and a starting point address identifying the first multicast packet transferring apparatus as a sending multicast transferring apparatus; and
a packet transferring means to transfer said converted unicast packet to a second multicast packet transferring apparatus acting as the receiving multicast packet transferring apparatus existing in another second domain.

2. A multicast packet transferring apparatus having an apparatus address comprising:
a receiving multicast packet transferring apparatus operating in a first domain and comprising
a packet reconstructing means to reconstruct an original multicast packet from a unicast packet fed from a sending multicast packet transferring apparatus existing in another, second domain,
the unicast packet fed from the multicast packet transferring apparatus having i) a first IP header with a multicast group destination address and a starting point transmitter address identifying the transmitter within the first domain, ii) a UDP header listing a destination port within the second domain and a starting point port within the first domain, and iii) a second IP header with a destination address identifying the receiving multicast packet transferring apparatus and a starting point address identifying the sending multicast transferring apparatus, and
the reconstructed multicast packet containing the first IP header and the UDP header, and being free of the second IP header; and
a rewriting means to rewrite for replacing the transmitter address contained in said first IP header of the reconstructed multicast packet with said destination address identifying the receiving multicast packet transferring apparatus as a rewritten transmitter address so that the receiving multicast packet transferring apparatus address is indicated to be the starting point address within the first IP header; and
a packet transferring means to transfer said multicast packet having said rewritten transmitter address to a specified receiver.

3. The multicast packet transferring apparatus according to claim 2, wherein the receiving multicast packet transferring apparatus further comprises:
information about at least said starting point transmitter address and a multicast group corresponding to each of port numbers is controlled and a destination port number contained in said multicast packet is rewritten to corresponding one of said port numbers.

4. A multicast packet transferring system comprising:
a first transferring apparatus existing in a first domain; and
a second transferring apparatus existing in a second domain,
wherein said first transferring apparatus converts a multicast packet fed from a transmitter within the first domain to a unicast packet and transfers said converted unicast packet to said second transferring apparatus,
the packet fed from the transmitter having i) a first IP header with a group destination address and a starting point address identifying the transmitter and ii) a UDP header listing a destination port and a starting point port, the converted unicast packet having the first IP header and a second IP header with a destination address identifying the second transferring apparatus and a starting point address identifying the first transferring apparatus, and wherein said second transferring apparatus reconstructs an original multicast packet from said unicast packet fed from said first transferring apparatus, rewrites to replace the starting point address identifying the transmitter contained in said reconstructed multicast packet with an address of said second transferring apparatus and transmits said rewritten multicast packet having said rewritten address to a specified receiver.

5. The multicast packet transferring system according to claim 4, wherein said second transferring apparatus controls information about at least said transmitter address and a multicast group corresponding to each of port numbers and rewrites a destination port number of said reconstructed multicast packet to corresponding one of said port numbers.

6. The multicast packet transferring system according to claim 4, wherein, when said specified receiver carries out communications with said transmitter in a unicast transmission manner, said specified receiver transmits said unicast packet to said second transferring apparatus having said rewritten transmitter address and said second transferring apparatus judges to which transmitter said unicast packet addressed to said second transferring apparatus is to be addressed, based on a port number which uniquely corresponds to each of receivers and transmitters belonging to a multicast group.

7. The multicast packet transferring system according to claim 4, wherein, by converting said multicast packet to said unicast packet and by transferring said converted unicast packet between said first domain and said second domain, a multicast path in which multicast transferring through a domain not supporting multicast transmission is established.

8. The multicast packet transferring system according to claim 4, wherein, by setting multicast transferring policies about peering representing transferring relations to said first and said second transferring apparatus, policies about permission transferring apparatus of packet transferring to receivers or transmitters belonging to a multicast group, communication qualities and accounting for packets are set.

9. A multicast packet transferring apparatus comprising:
a computer;
a program for causing said computer to carry out a procedure for receiving a multicast packet from a transmitter, a procedure for converting said multicast packet to a unicast packet and a procedure for transferring said converted unicast packet to a multicast packet transferring apparatus existing in another domain, wherein, the multicast packet from the transmitter has i) a first IP header with a group destination address and a starting point address identifying the transmitter and ii) a UDP header listing a destination port and a starting point port, and the converted unicast packet has the first IP header, and a second IP header with a destination address identifying a receiving multicast packet transferring apparatus and a starting point address a sending multicast transferring apparatus.

10. A multicast packet transferring apparatus comprising:
a computer within a receiving domain;
a program for causing said computer to carry out a procedure for receiving a unicast packet from a multicast packet transferring apparatus existing in another sending domain, a procedure for reconstructing an original multicast packet from said received unicast packet, a procedure for rewriting to replace a transmitter address contained in said reconstructed multicast packet with an address of a transferring apparatus having received said unicast packet and a procedure for transferring said rewritten multicast packet having said rewritten transmitter address to specified receiver, wherein, the received unicast packet from the multicast packet transferring apparatus in the sending domain has i) a first IP header with a multicast group destination address and a starting point transmitter address identifying a transmitter within the sending domain, ii) a UDP header listing a destination port within the receiving domain and a starting point port within the sending domain, and iii) a second IP header with a destination address identifying a receiving multicast packet transferring apparatus and a starting point address identifying the sending multicast transferring apparatus, and the reconstructed multicast packet containing the first IP header and the UDP header, and being free of the second IP header, the first IP header of the reconstructed multicast packet identifying the receiving multicast packet transferring apparatus address as the starting point address.

11. A computer readable storage medium storing a program for causing a computer to carry out a procedure for receiving a multicast packet from a transmitter, a procedure for converting said multicast packet to a unicast packet and a procedure for transferring said converted unicast packet to a multicast packet transferring apparatus existing in another domain, wherein, the multicast packet from the transmitter has i) a first IP header with a group destination address and a starting point address identifying the transmitter and ii) a UDP header listing a destination port and a starting point port, and the converted unicast packet has the first IP header, and a second IP header with a destination address identifying a receiving multicast packet transferring apparatus and a starting point address a sending multicast transferring apparatus.

12. A computer readable storage medium storing a program for causing a computer in a receiving domain to carry out a procedure for receiving a unicast packet from a multicast packet transferring apparatus existing in another sending domain, a procedure for reconstructing an original multicast packet from said received unicast packet, a procedure for rewriting to replace a transmitter address contained in said reconstructed multicast packet with an address of a transferring apparatus having received said unicast packet and a procedure for transferring said rewritten multicast packet having said rewritten transmitter address to specified receiver, wherein, the received unicast packet from the multicast packet transferring apparatus in the sending domain has i) a first IP header with a multicast group destination address and a starting point transmitter address identifying a transmitter within the sending domain, ii) a UDP header listing a destination port within the receiving domain and a starting point port within the sending domain, and iii) a second IP header with a destination address identifying a receiving multicast packet transferring apparatus and a starting point address identifying the sending multicast transferring apparatus, and the reconstructed multicast packet containing the first IP header, and the UDP header, and being free of the second IP header, the first IP header of the reconstructed multicast packet identifying the receiving multicast packet transferring apparatus address as the starting point address.

* * * * *